(12) United States Patent
Hentkowski

(10) Patent No.: US 11,525,526 B1
(45) Date of Patent: Dec. 13, 2022

(54) PIPE HANGING SYSTEM

(71) Applicant: Jimmie Hentkowski, Posen, MI (US)

(72) Inventor: Jimmie Hentkowski, Posen, MI (US)

( * ) Notice: Subject to any disclaimer, the term of this patent is extended or adjusted under 35 U.S.C. 154(b) by 0 days.

(21) Appl. No.: 17/354,743

(22) Filed: Jun. 22, 2021

Related U.S. Application Data

(60) Provisional application No. 63/043,444, filed on Jun. 24, 2020.

(51) Int. Cl.
| | |
|---|---|
| *F16L 3/12* | (2006.01) |
| *F16L 3/26* | (2006.01) |
| *F16L 3/127* | (2006.01) |
| *E21F 17/02* | (2006.01) |

(52) U.S. Cl.
CPC ............ *F16L 3/1218* (2013.01); *F16L 3/127* (2013.01); *F16L 3/26* (2013.01); *E21F 17/02* (2013.01)

(58) Field of Classification Search
CPC . F16L 3/1218; F16L 3/26; F16L 3/127; E21F 17/02
See application file for complete search history.

(56) References Cited

U.S. PATENT DOCUMENTS

| | | | | |
|---|---|---|---|---|
| 1,131,867 A | * | 3/1915 | Pyle | ........................... F16L 3/04 248/65 |
| 2,291,148 A | * | 7/1942 | Carson | ...................... F16L 3/14 248/58 |
| 2,319,832 A | * | 5/1943 | Trochim | ................... F16L 3/14 248/71 |
| 2,339,565 A | * | 1/1944 | Goldberg | .................. F16L 3/11 248/62 |
| 2,339,992 A | | 1/1944 | Hohmeister | |
| 3,266,761 A | * | 8/1966 | Walton | ................... F16L 3/1207 174/164 |
| 3,273,837 A | | 9/1966 | Willert | |
| 3,559,910 A | | 2/1971 | Babb | |
| 4,158,541 A | * | 6/1979 | Klechka | ..................... C10L 9/08 432/235 |
| 4,254,930 A | | 3/1981 | Warren | |

(Continued)

FOREIGN PATENT DOCUMENTS

| | | | | | |
|---|---|---|---|---|---|
| GB | | 2246595 A | * | 2/1992 | ............. E21F 17/02 |
| GB | | 2523721 | | 9/2015 | |
| WO | WO-2015135038 A1 | | * | 9/2015 | ............. B25B 31/00 |

*Primary Examiner* — Eret C McNichols
(74) *Attorney, Agent, or Firm* — John Rizvi; The Patent Professor, P.A.

(57) ABSTRACT

A pipe hanging system for aligned installation of a pipe from a support system without the use of external measuring devices incudes a hanger assembly having one or more hanger members each having a cradle dimensioned to receive at least a portion of the pipe in a supported relation therein. The hanger members include a plurality of alignment marks disposed on and visible along at least a portion of the hanger member to facilitate positioning the hanger member relative to the support members without the use of external measuring devices. A mounting assembly to mount each hanger member to one of the plurality of support members in an aligned orientation, wherein an aligned orientation is at least partially defined by a portion of the cradle disposed a predetermined distance from a preselected portion of the support member onto which the hanger member is mounted.

9 Claims, 7 Drawing Sheets

(56) References Cited

U.S. PATENT DOCUMENTS

| | | | |
|---|---|---|---|
| 4,266,745 A * | 5/1981 | Jones | F16L 3/14 248/58 |
| 4,318,518 A * | 3/1982 | Davis | F16L 3/14 248/74.3 |
| 4,407,478 A | 10/1983 | Hodges | |
| 4,641,989 A | 2/1987 | Maddi | |
| 4,941,630 A * | 7/1990 | Albano | F16L 3/13 248/62 |
| 5,005,789 A * | 4/1991 | Jones | F16L 3/133 248/58 |
| 5,221,064 A | 6/1993 | Hodges | |
| D338,827 S * | 8/1993 | Rumble | D8/380 |
| 5,350,141 A | 9/1994 | Perrault et al. | |
| 5,385,320 A * | 1/1995 | Ismert | F16L 3/10 248/62 |
| 5,542,631 A | 8/1996 | Bruno | |
| 5,746,401 A * | 5/1998 | Condon | F16L 3/133 248/62 |
| 5,779,198 A * | 7/1998 | Rutherford | E21F 17/02 248/68.1 |
| 5,845,882 A * | 12/1998 | Hodges | E21F 17/02 248/62 |
| 5,890,683 A | 4/1999 | DePietro | |
| D564,866 S * | 3/2008 | Ellery | D8/373 |
| 7,429,020 B2 | 9/2008 | Huebner et al. | |
| 7,441,729 B2 * | 10/2008 | Humber | F16L 3/02 248/58 |
| 8,356,777 B2 | 1/2013 | Miles et al. | |
| 9,212,770 B2 * | 12/2015 | Richard | F24F 13/0209 |
| 9,347,587 B2 * | 5/2016 | Allivato, Sr. | F16L 3/1207 |
| 11,079,041 B2 * | 8/2021 | Gregory | F16L 3/04 |
| 2007/0205335 A1 * | 9/2007 | Huebner | F16L 3/14 248/58 |
| 2007/0246116 A1 | 10/2007 | Peak et al. | |
| 2019/0072213 A1 | 3/2019 | Kerlin | |
| 2021/0190235 A1 * | 6/2021 | Gregory | F16L 3/04 |

* cited by examiner

PIPE HANGING SYSTEM

CROSS-REFERENCE TO RELATED APPLICATIONS

This application claims the benefit of U.S. Provisional Patent Application Ser. No. 63/043,444 filed on Jun. 24, 2020, which is incorporated by reference herein in its entirety.

FIELD OF THE INVENTION

The present invention relates generally to a pipe hanging system wherein a pipe may be quickly and easily installed in alignment with a support system, such as a truss or joist system, without the use of external measuring devices.

BACKGROUND OF THE INVENTION

Present-day construction of a new building whether for commercial or residential use include a complex array of utility and amenity services. These include utility services such as, electrical service, back-up electrical generator service, natural gas service, fuel oil service, water supply service, water drainage service, HVAC service and/or security system service, to name a few. More recently, amenity services such as home entertainment service, wired or wireless computer service, cable or satellite television service, etc., are commonplace today as well. It will be appreciated that this array of utility and amenity services are provided for in the construction of a new building, or while refurbishing an existing structure.

It is also common for one or more of the various services noted above to be provided to and distributed throughout a building via a network of pipes and/or conduits of various sizes, shapes, and materials of construction. Virtually every building constructed or refurbished today includes some form of water supply service and a corresponding water drainage service. A water supply service typically includes one or more of a meter or series of meters, numerous valves, such as shut off valves, pressure relief valves, etc., hot water heater supply and delivery lines, etc. Oftentimes, the majority of water supply service piping and appurtenances are installed below the main floor in a basement or designated utility service area of the building. Further, water supply service piping are often installed onto the underside of a support system of the main floor of the building, such as a truss or joist system.

Likewise, water drainage service lines are also commonly installed onto the underside of support system along with natural gas pipelines, electrical conduits, telecommunications lines, etc., just to name a few. Water drainage lines require special attention as they must maintain a proper slope to assure sufficient head pressure for gravity discharge from the building.

Typically, the array of pipes and/or conduits required to provide and distribute these various utility and or amenity services throughout a building are installed to individual support members, such as, a truss member or a joist member, primarily constructed of wood, by way of numerous individual straps or hangers which are nailed into each of the individual trusts or joist embers. Since about the 1980s, and continuing through today, TJI and TGI wood truss support systems became commonplace in new home construction.

In order to maintain some semblance of alignment in the installation of the various pipes and/or conduits to the plurality of truss or joist members, efforts are made to maintain a specified distance between the bottom of a truss or joist member and the top or bottom of a pipe or conduit being installed. More in particular, measurements must be made at each individual support member prior to nailing a strap or hanger thereto. As will be appreciated, this is time consuming at best, and in instances where a strap or hanger is already attached to a portion of a pipe or conduit, the installation process becomes quite difficult, and at times, downright dangerous. This is further compounded by the fact that the measurements and installation of the strap or hanger by nailing it to a truss or joist member occurs while an installer is in an elevated and partially inverted position on a ladder or a scaffold, or crouched down in a crawlspace beneath a support structure.

As will be further appreciated, despite best efforts to measure and accurately maintain a specified distance between the bottom of a truss or joist member in the top or bottom of the pipe or conduit being installed, it is all too common for pipe runs to be installed out of alignment, which can create considerable problems at terminal connections, particularly when dealing with longer pipe runs of 60 or 70 feet or more. Furthermore, it is not uncommon to find a pipe which is not properly seated in each and every strap or hanger utilized to install the pipe to the support members, which can result in undue tension when a strap or hanger is nailed to a support member short of the specified distance from the bottom of the support member. Conversely, if a strap or hanger is nailed to a support member in excess of the specified distance, the pipe may be free to swing or sway at that point in the installation. In addition, improper seating of pipes in straps or hangers can result in exacerbating the sounds of fluid flow through the pipe.

In either instance, inaccuracies in the positioning of the strap or hanger relative to the support members to which they are mounted create stress points which could ultimately result in a failure of the installation. Unfortunately, these inaccuracies are often undiscovered until the installation is complete and final expense inspection occurs, or worse, upon system failure. In order to correct inaccurately positioned straps or hangers, nails must be pulled from the truss or joist member, a process which may or may not irreparably damage strap or hanger itself, measuring, repositioning and re-nailing the strap or hanger at a proper height such that the pipe is properly seated therein. As will be appreciated, this results in an unnecessary waste of materials and installer time to correct.

Accordingly, there is an established need for a system which resolves one or more of the foregoing problems. Specifically, there is a need for a system which allows for quick and easy installation of a pipe or a conduit in precise alignment with a support system without the need for measurement during installation.

SUMMARY OF THE INVENTION

The present invention is directed to a pipe hanging system wherein a pipe may be quickly and easily installed in alignment with a support system, such as a truss or joist system, without the use of external measuring devices.

In a first implementation of the invention, a pipe hanging system for aligned installation of a pipe from a plurality of support members of a support system without the use of external measuring devices comprises: a hanger assembly including at least one hanger member having a cradle dimensioned to receive at least a portion of the pipe in a supported relation therein; the at least one hanger member further comprising one or more arms extending from the cradle; an alignment assembly comprising a plurality of alignment marks disposed on and visible along at least a portion of at least one arm of the hanger member to facilitate positioning the hanger member relative to a preselected portion of the plurality of support members without the use of external measuring devices; and a mounting assembly to mount the hanger member to at least one of the plurality of support members in an aligned orientation, wherein an aligned orientation is at least partially defined by a portion of the cradle disposed a predetermined distance from the preselected portion of the support member onto which the hanger member is mounted.

In a second aspect, the pipe hanging system can include an alignment assembly further comprising a plurality of alignment indicators disposed on and visible along at least a portion of one or more arms of the hanger members, each of the plurality of alignment indicators corresponding to a different one of the plurality of alignment marks.

In another aspect, the pipe hanging system may have a plurality of alignment indicators comprising one or more of a numeric character, an alphabetic character, an alphanumeric character, or a symbol.

In one further aspect, the pipe hanging system can include a plurality of alignment marks disposed on and visible along at least a portion of each of a plurality of arms of a hanger member.

in still another aspect, the pipe hanging system may include hanger members having a plurality of arms which extend upwardly from the cradle in a substantially parallel and coplanar orientation with one another.

In one additional aspect, the pipe hanging system can have a mounting assembly comprising a plurality of mounting apertures through at least a portion of one or more arms of a hanger member.

In yet another aspect, the pipe hanging system may include a mounting assembly comprising at least one reusable fastener disposable through at least one of a plurality of mounting apertures through an arm of a hanger member and into a portion of one of the plurality of support members so as to mount the hanger member thereto.

In still one further aspect, the pipe hanging system can have inner surfaces of corresponding ones of the plurality of arms of each hanger member at least partially define a hanger member clearance there between, wherein the hanger member clearance is greater than an outside diameter of the pipe to be received therein between.

In yet one additional aspect, the pipe hanging system may include a noise reduction assembly comprising a noise reduction member disposed in a covering relation to the cradle of a hanger member, the noise reduction member comprising a noise reduction cradle dimensioned to receive at least a portion of the pipe in a supported relation therein, wherein the noise reduction member dampers the sounds associated with fluid flow there through, such as, for example the noise often created by a hot fluid flowing through a pipe.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a pipe hanging system wherein a pipe may be quickly and easily installed in alignment with a support system, such as a truss or joist system, without the need for measurements, and therefore, without requiring the use of external measuring devices.

Figure 1:
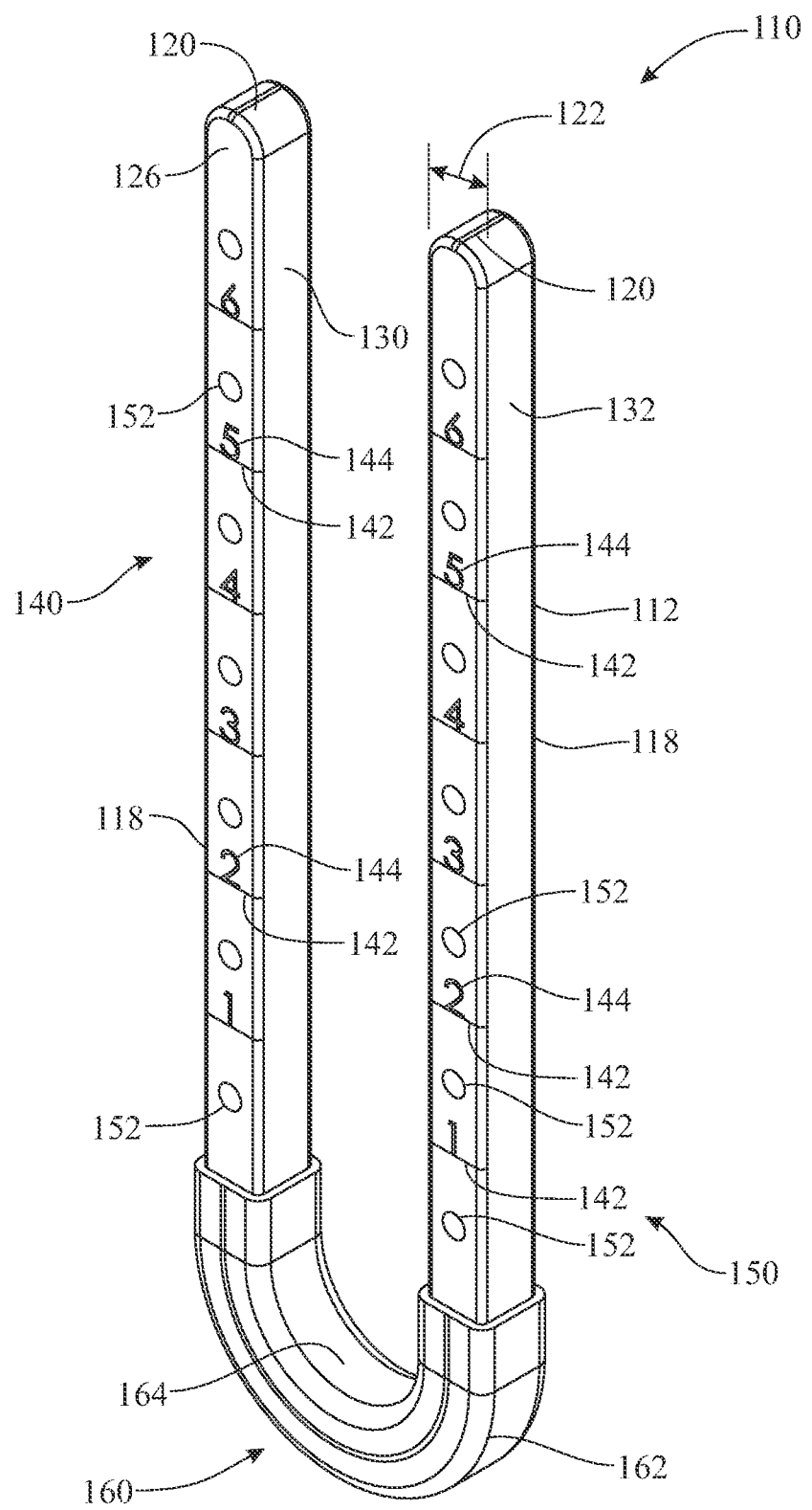
FIG. 1 presents a front perspective view of one illustrative embodiment of a hanger member, in accordance with the present invention.
Figure 2:
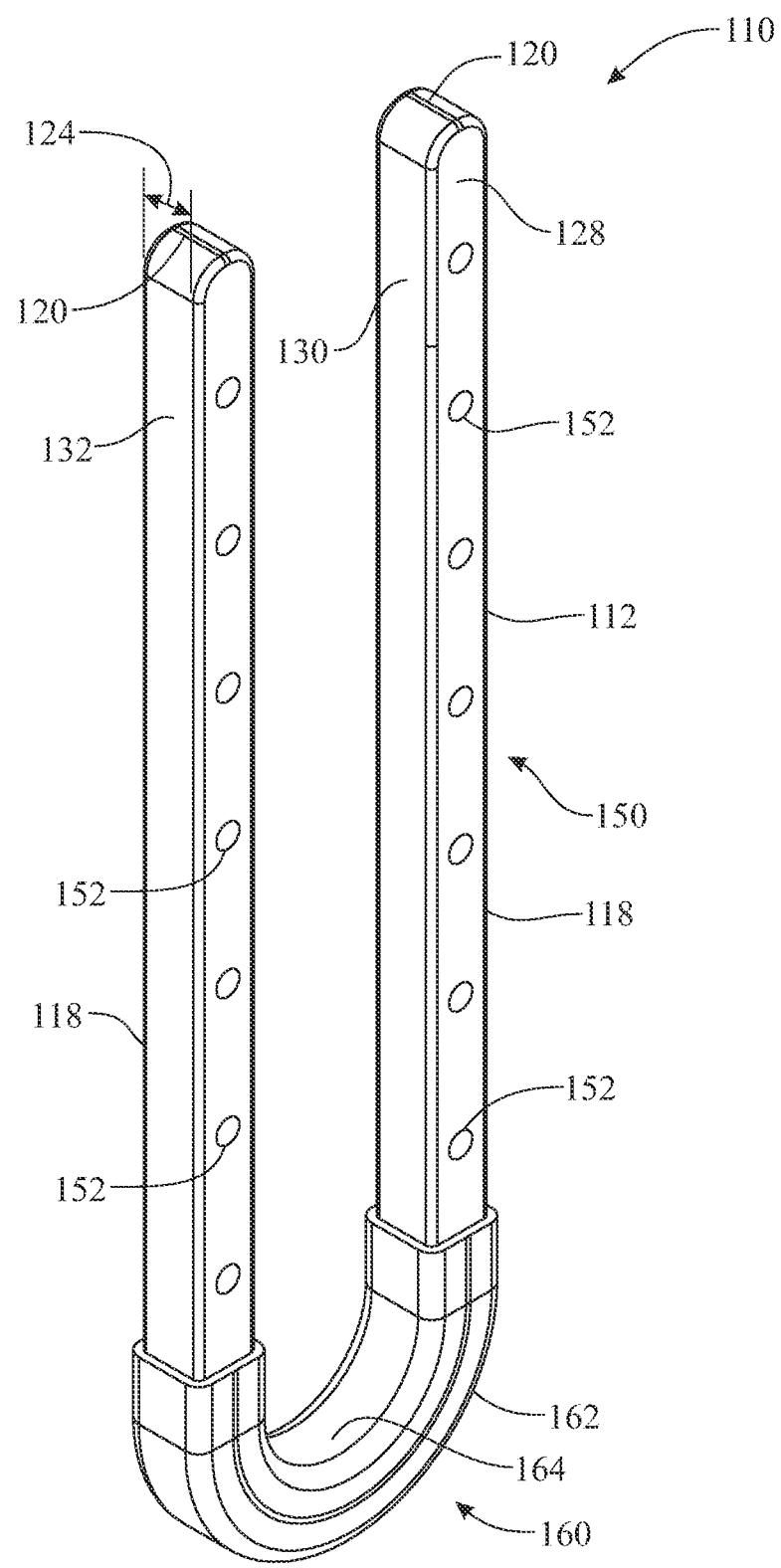
FIG. 2 presents a rear perspective view of one illustrative embodiment of a hanger member, in accordance with the present invention.

Referring initially to FIGS. 1 and 2, front and rear perspective views, respectively, of one illustrative embodiment of a hanger member 112 of a hanger assembly 110 in accordance with the present invention are presented. More in particular, a pipe hanging system 100 in accordance with the present invention includes a hanger assembly 110 comprising at least one hanger member 112. As shown best in FIG. 7, a hanger assembly 110 of a pipe hanging system 100 in accordance with at least one embodiment of the present invention comprises a plurality of hanger members 112 each mounted to a different support member, such as, by way of example, a truss or joist member, of a support system as may be installed in commercial or residential buildings.

It is to be appreciated that a hanger member 112 in accordance with the present invention may be constructed of any of a plurality of rigid materials having sufficient structural strength and integrity to support the weight of a pipe and its contents while in use. By way of example only, a hanger member 112 in accordance with the present invention may be constructed from metal, metal alloy, plastic, fiberglass, wood, engineered composite materials, etc., or combinations thereof, just to name a few.

As before, a hanger assembly 110 in accordance with the present invention includes at least one hanger member 112, A hanger member 112 includes a cradle 114 and at least one arm 118 extending from a portion of the cradle 114. With reference once again FIGS. 1 and 2, a hanger member 112 in accordance with at least one embodiment of the present invention comprises a plurality of arms 118. As may be seen throughout the figures, the plurality of arms 118 of each hanger member 112 extend from opposite sides or ends of the cradle 114. More in particular, at least one embodiment, a plurality of arms 118 extend from opposite sides of the cradle 114 in a substantially parallel and coplanar orientation, as also shown throughout the figures. As further shown in the illustrative embodiments of FIGS. 1 and 2, each of the plurality of arms 118 extending from opposite portions of the cradle 114 terminate at a distal end 120.

In at least one embodiment of a pipe hanging system 100 in accordance with the present invention, a hanger member 112 comprises an overall length of about ten inches when measured from a distal end 120 of an arm 118 to the outer bottom surface of a cradle 114. At least one alternative embodiment, a hanger member comprises an overall length of about six inches when measured as noted above. As will be appreciated by those of skill in the art, a hanger member 112 in accordance with the present pipe hanging system 100 may comprise any of a variety of overall lengths such as may be dictated by such factors as space limitations beneath a support system of a structure, size and weight of the pipe to be supported, etc., just to name a few.

A cradle 114 of a hanger member 112 in accordance with one embodiment of the present invention includes a cradle seat 116 which is dimensioned to receive at least a portion of a pipe in a supported relation therein. As such, in at least one embodiment, a cradle 114 of a hanger member 112 comprises a generally arcuate concave configuration having a cradle seat 116 disposed at an apex thereof. In one further embodiment, a cradle 114 of a hanger member 112 comprises a generally semicircular configuration having a cradle seat 116 disposed at a base thereof so as to facilitate supporting a substantially round pipe therein.

Looking once again to the illustrative embodiments of FIGS. 1 and 2, an arm 118 of a hanger member 112 in accordance with the present invention is at least partially defined by a width 122 and a depth 124. As shown throughout the figures, the width 122 and the depth 124 of each arm 118 of each hanger member 112 are of approximately equal dimensions. It is to be appreciated that a width 122 and/or a depth 124 of an arm 118 of a hanger member 112 may comprise any of a variety of dimensions, within the scope and intent of the present invention. As just one example, a width 122 of an arm 118 may be greater than a depth 124 of the arm 118, or vice versa.

With continued reference to the illustrative embodiments of FIGS. 1 and 2, each arm 118 of hanger member 112 comprises a plurality of surfaces. In particular, each arm 118 comprises a front arm surface 126, a rear arm surface 128, an inner arm surface 130, and an outer arm surface 132. With reference to the illustrative embodiment of 6, the inner arm surfaces 132 of the corresponding arms 118 at least partially define a hanger member clearance 134 there between. In accordance with at least one embodiment, it is desirable to have a minimum clearance between the sidewalk of the pipe being supported and the inner arm surfaces 132 of the arms 118 of a hanger member 112, to allow room for the installation of a noise reduction member 162, such as is often provided in hot fluid service pipe installations, as is discussed in greater detail below. In accordance with at least one further embodiment of the present invention, it is desirable to have a minimum clearance between the sidewalk of the pipe being supported and the inner arm surfaces 132 of the arms 118 of a hanger member 112, to allow positioning of the pipe while supported in the cradle 114 of the hanger member 112 such as may be needed for purposes of installing fittings, pipe connections, terminal connections, etc. In at least one embodiment, a clearance of about one-sixteenth of an inch is desired between each inner arm surfaces 130 of the arms 118 of the hanger member 112 and the sidewalk of a pipe supported therein. As such, in one further embodiment, a hanger member clearance 134 is at least one-eighth of an inch greater than the outside diameter of a pipe to be supported therein.

With continued reference to the illustrative embodiment of FIG. 1, a hanger member 112 of a hanger assembly 110 in accordance with the present invention further comprises an alignment assembly 140. An alignment assembly 140 includes a plurality of alignment marks 142 disposed on at least a portion of at least one arm 118 of a hanger member 112. As may be seen from illustrative embodiment of FIG. 1, an alignment assembly 140 may comprise a plurality of alignment marks 142 disposed on portions of each of a plurality of arms 118 of a hanger member 112. In at least one embodiment, a plurality of alignment marks 142 are formed directly onto one or more arms 118 such as by etching, scoring, molding, etc., just to name a few. In at least one further embodiment, a plurality of alignment marks 142 are applied onto one or more aims 118 such as, by way of example, by painting, dying, permanent marker, self-adhering sticker, etc.

As shown throughout the figures, such as, by way of example, the illustrative embodiment of FIG. 1, the plurality alignment marks 142 of the alignment assembly 140 are disposed on each of the plurality of arms 118, such that the alignment marks 142 are readily visible along the front arm surface 126 of each of the plurality of arms 118. It is to be appreciated that it is within the scope and intent of the present invention for one or more alignment marks 142 of an alignment assembly 140 to he disposed on and readily visible along another or an additional surface of an arm 118, such as, by way of example, one or more alignment marks 142 may be disposed on a front arm surface 126 and a rear arm surface 128, or on a front arm surface 126 and either or both of an inner arm surface 130 or an outer arm surface 132, etc.

Figure 5:
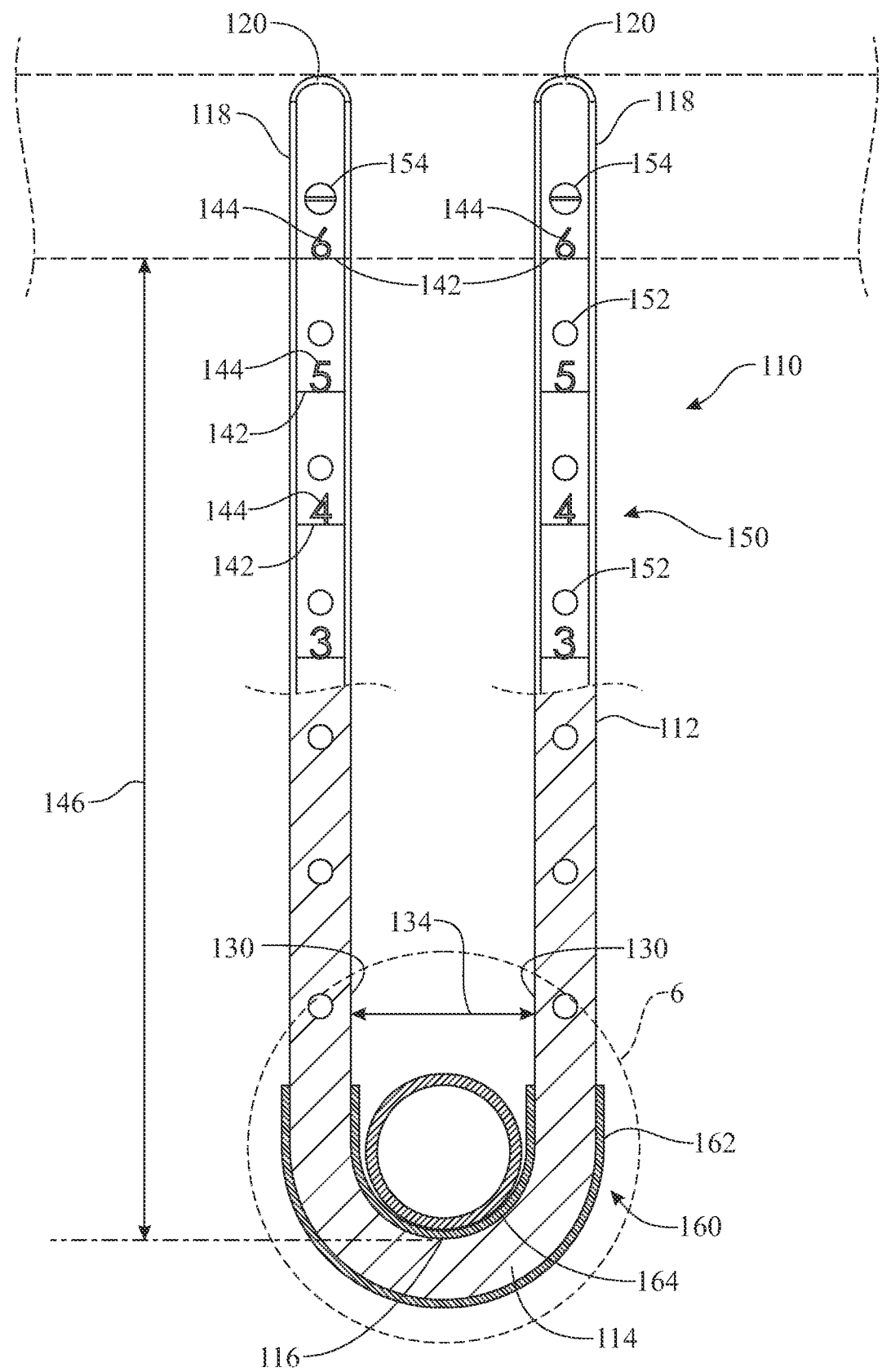
FIG. 5 presents a partial front cross-sectional elevation of one illustrative embodiment of a hanger member installed on a support member and having a pipe supported therein, in accordance with the present invention.

In accordance with at least one embodiment of the present invention, the plurality of alignment marks 142 disposed on and visible along a front arm surface 126 of at least one arm 118 of a hanger member 112 serve to facilitate positioning a hanger member 112 relative to a preselected portion of a support member without the use of external measuring devices such as, by way of example only, a rule, a tape measure, etc. More in particular, in at least one embodiment, a preselected portion of a support member can include a bottom edge or surface of a truss or joist member of a support system, and a hanger member 112 may be quickly and easily positioned relative to the support member via a simple visual aligning of corresponding alignment marks 142 with the bottom edge or surface of the support member, such as is shown best in the illustrative embodiment of FIG. 5.

In at least one further embodiment of a pipe hanging system 100 in accordance with the present invention, an alignment assembly 140 further comprises a plurality of alignment indicators 144. An alignment indicator 144 in accordance with the present invention may any of a number of recognizable indices such as, but in no manner limited to a numeric character, an alphabetic character, an alphanumeric character, or other such recognizable symbol. As with the plurality of alignment marks 142, in at least one embodiment a plurality of alignment indicators 144 are formed directly onto one or more arms 118 such as by etching, scoring, molding, etc., just to name a few. Similarly, in at least one further embodiment, a plurality of alignment indicators 144 are applied onto one or more arms 118 such as, by way of example, by painting, dying, permanent marker, self-adhering sticker, etc. Also as before, it will be appreciated that it is within the scope and intent of the present invention for one or more alignment indicators 142 may he disposed on and readily visible along one or more surfaces of an arm 118, such as, by way of example, one or more alignment marks 142 may be disposed on a front arm surface 126, or on a front arm surface 126 and a rear arm surface 128, or on a front arm surface 126 and either or both of an inner arm surface 130 or an outer arm surface 132, etc.

In at least one embodiment of the present invention, an alignment assembly 140 comprises a plurality of alignment marks 142 disposed on and visible along the front arm surface 126 of each of a plurality of arms 118 of a hanger member 112, and the alignment assembly 140 further comprises a plurality of alignment indicators 144, such as is shown best in the illustrative embodiment of FIG. 1, wherein each of the plurality of alignment indicators 144 corresponds to one of the plurality of alignment marks 142 disposed on and visible along the front arm surface 126 of each of a plurality of arms 118 of a hanger member 112. With continued reference to FIG. 1, in at least one embodiment, each of the plurality of alignment indicators 144 is in the form of a numeric character and further, the alignment indicators 144 associated with corresponding pairs of alignment marks 142 along the front arm surfaces 126 of the plurality of arms 118 comprise the same numeric character. Stated otherwise, the uppermost alignment marks 142 shown on the front arm surfaces 126 of the arms 118 of hanger member 112 are each associated with alignment indicators 144 bearing the numeric character "6", as may be seen in FIG. 1. Similarly the lowermost alignment marks 142 shown on the front arm surfaces 126 of the arms 118 of hanger member 112 are each associated with alignment indicators 144 bearing the numeric character "1", and so on, once again, as may be seen in FIG. 1.

Figure 7:
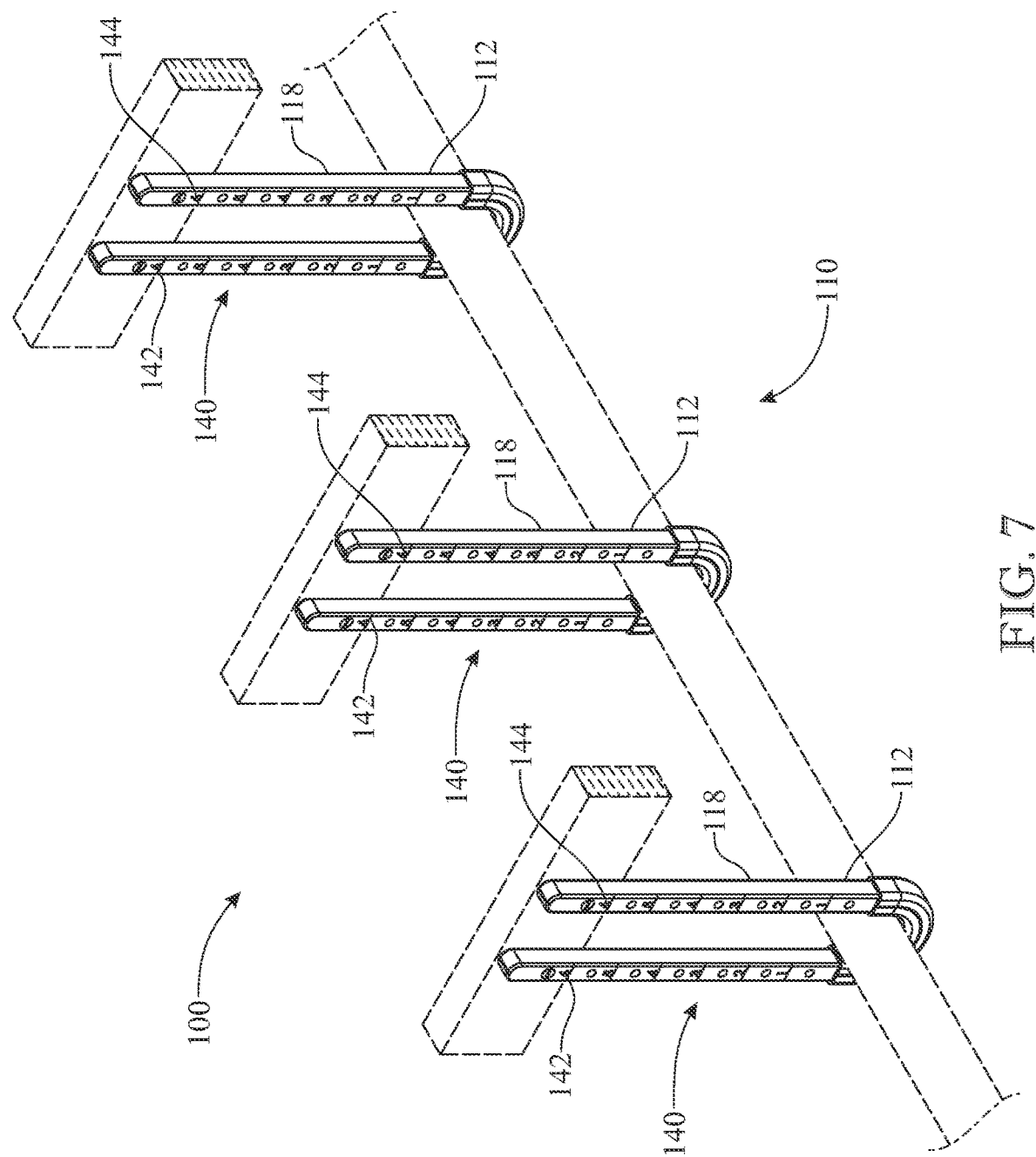
FIG. 7 presents a front perspective view of one illustrative embodiment of a pipe hanging system including a plurality of hanger members each installed on a different one of a plurality of support members and having a pipe supported collectively therein, in accordance with the present invention.

Looking next to the illustrative embodiment of FIG. 7, a pipe hanging system 100 in accordance with the present invention is shown having a hanger assembly 110 comprising a plurality of hanger members 112 which collectively support a pipe in an aligned installation relative to each of a plurality of support members of a support system. More in particular, each of a plurality of hanger members 112 is positioned in an aligned orientation with a corresponding one of the plurality of support members, wherein the aligned orientation is at least partially defined by a portion of a cradle 114 of the hanger member 112 disposed a predetermined distance 146 from the preselected portion of the support member onto which the hanger member 112 is mounted. With reference to the illustrative embodiment of FIG. 5, a predetermined distance 146 is illustrated and is represented by the distance between the alignment marks 142 corresponding to the alignment indicators 144 comprising the numeric character "6" and the top of cradle seat 116.

With continued reference to the illustrative embodiment of FIG. 7, the plurality of hanger members 112 of the hanger assembly 110 of the pipe hanging system 100 of the present invention are each positioned relative to a corresponding one of support members via alignment marks 142 disposed on the arms 118 of each of the hanger members corresponding to the alignment indicators 144 comprising the numeric character "6". As such, and as will be appreciated from the foregoing, the top of the cradle seat 116 of each of the plurality of hanger members 112 is disposed an equal predetermined distance 146 from the preselected portion, i.e., the bottom surface or edge, of each of the plurality support members of the support system onto which the pipe is installed, such that the entire pipe is installed level relative to each of the support members of the support system without the need for external measuring devices. It will be further appreciated by those of skill in the art that a pipe may be quickly and easily installed in any of a plurality of aligned arrangements, i.e., in any of a plurality of equal predetermined distances 146 relative to the support members of the support system, by simply positioning each hanger member 112 of the hanger assembly 110 relative to a corresponding one of the plurality of support members via a simple visual alignment of the plurality of alignment marks 142 corresponding to the plurality of alignment indicators 144 comprising the same numeric character, alphabetic character, alphanumeric character, or other such recognizable symbol. It is also to be appreciated that the present pipe hanging system 100 may be utilized to quickly and easily install a pipe at a predetermined slope, such as is typically required by local building codes, particularly for drainage pipe runs. By way of example, in one embodiment, a first hanger member 112 is positioned relative to a corresponding one of the support members via an alignment mark 142 corresponding to an alignment indicator 144 of "6"; a second hanger member 112 is positioned relative to a corresponding one of the support members via an alignment mark 142 corresponding to an alignment indicator 144 of "5"; and so on, such that the pipe is installed with a proper predetermined slope, once again, without the need for external measuring devices. A chalk line may he utilized to facilitate directional origination of the plurality of hanger members 112 of the hanger assembly 110 relative to the plurality of support members of the support system.

Figure 4:
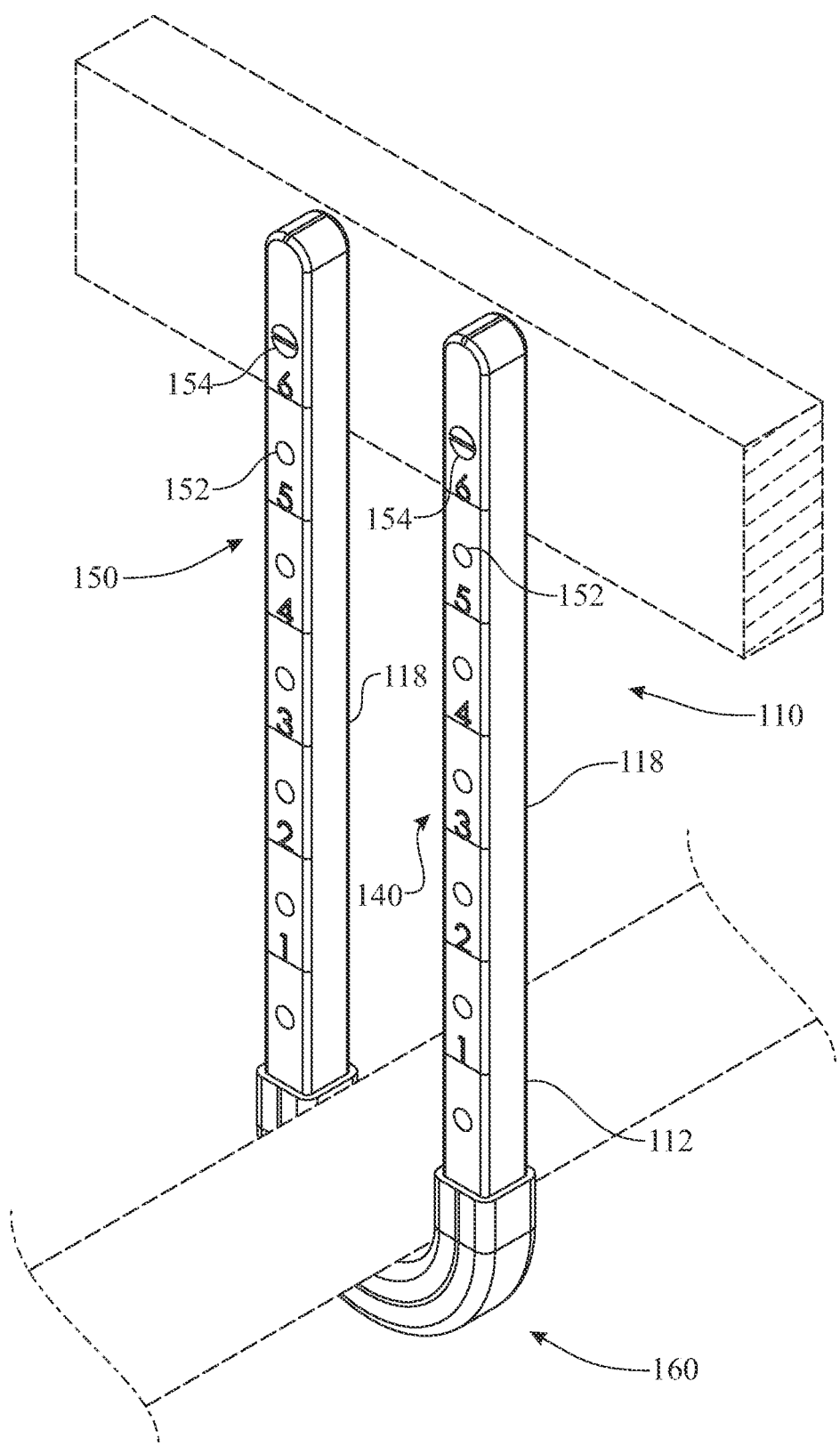
FIG. 4 presents a front perspective view of the hanger member of FIG. 1 installed on a support member and having a pipe supported therein, in accordance with the present invention.

Each hanger member 112 of the hanger assembly 110 in accordance with the present invention further comprises a mounting assembly 150. In at least one embodiment, a mounting assembly 150 comprises at least one mounting aperture 152 disposed through at least one arm 118 of a hanger member 112. With reference to the illustrative embodiments shown throughout the figures, a mounting assembly 150 in accordance with the present invention may comprise a plurality of mounting apertures 152 disposed through each of a plurality of arms 118 of a hanger member 112. Looking once again to the illustrative embodiment of FIG. 1, a mounting assembly 150 in accordance with at least one embodiment of the present invention comprises a plurality of mounting apertures 152 wherein each of the plurality of mounting apertures 152 is positioned equidistant from one or more of the plurality of alignment marks 142 of an alignment assembly 140. In addition, at least one embodiment, a mounting assembly 150 in accordance with the present invention comprises at least one fastener 154 to mount a corresponding hanger member 112 to a support member. More particular, the at least one fastener 154 is dimensioned to be received into and through one of a corresponding one of the plurality of mounting apertures 152, and into at least a portion of a support member to which a hanger member 112 is mounted. In at least one embodiment, a mounting assembly 150 comprises a plurality of fasteners 154 to mount a corresponding hanger member 112 to a support member, such as is shown best in the illustrative embodiment of FIG. 4.

Figure 3:
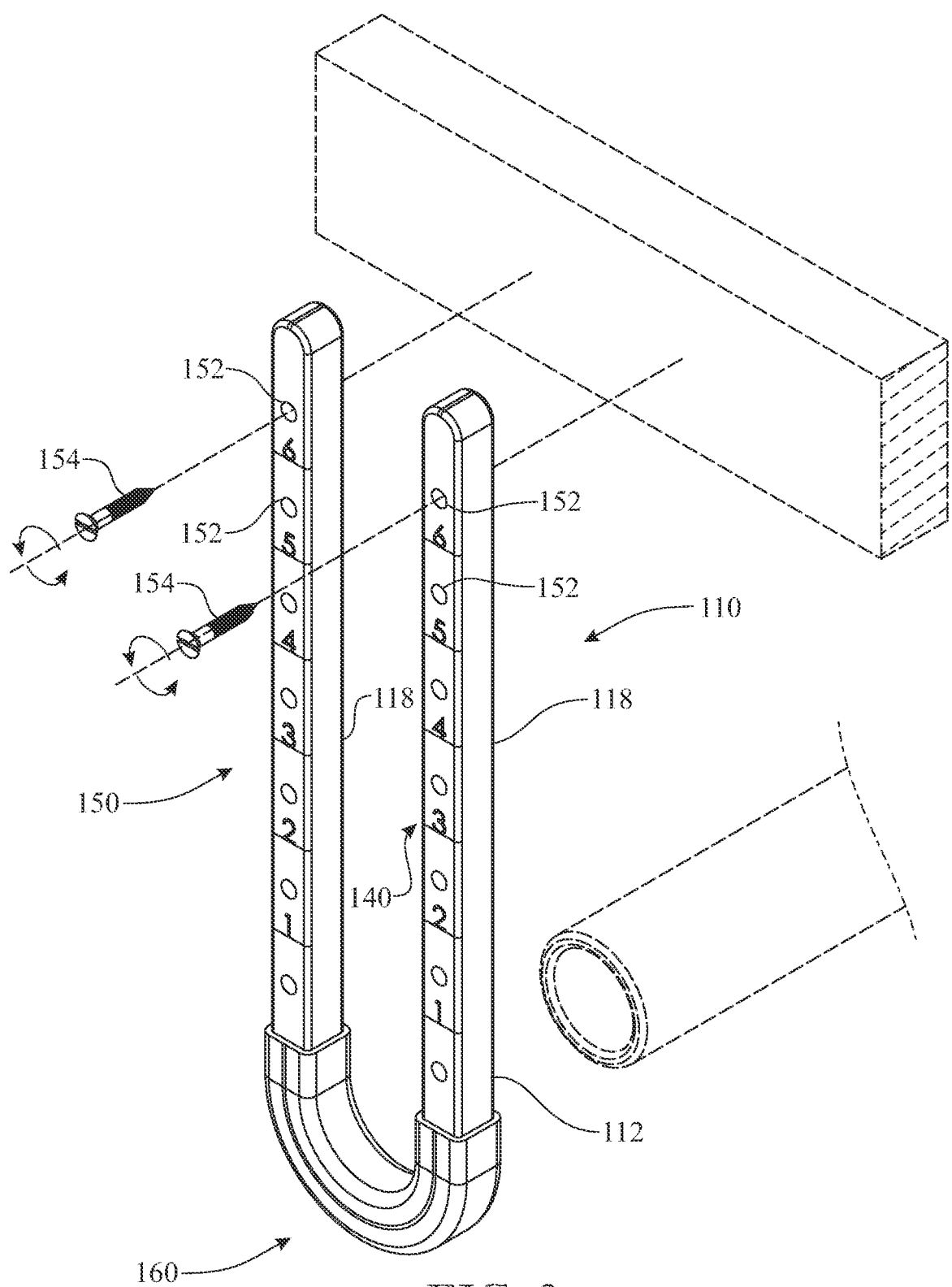
FIG. 3 presents a partially exploded front perspective view of the hanger member of FIG. 1 prior to installing on a support member and supporting as pipe therein, in accordance with the present invention.

In at least one further embodiment, a mounting assembly 150 comprises one or more reusable fasteners 154 such that the hanger member 112 may be quickly and easily repositioned relative to a corresponding support member, such as may be required during installation of relatively long pipe runs. A reusable fastener 154 may comprise any of a number of mechanical fasteners including but not limited to a wood screw, a nut and bolt, etc. As shown in the illustrative embodiment of FIG. 3, a mounting assembly 150 comprises a plurality of reusable fasteners 154 comprising wood screws which are each dimensioned to be received in and through corresponding mounting apertures 152 disposed through each of the plurality of arms 118 of the hanger member 112, to facilitate mounting the hanger member 112 to a corresponding one of the plurality of support members.

With reference once again to the illustrative embodiment of FIG. 1, a hanger member 112 of a hanger assembly 110 in accordance with the present invention may further comprise a noise reduction assembly 160. In at least one embodiment, a noise reduction assembly 160 comprises at least one noise reduction member 162 disposed in an at least in an at least partially covering relation to at least a portion of the hanger assembly 112. As shown throughout the figures, a noise reduction member 162 is disposed in a fully covering relation to portions of both an inner arm surface 130 and an outer arm surface 132 of a hanger member 112, however, it is to be appreciated that in at least one embodiment of the present invention, a noise reduction member 162 is disposed in a covering relation to solely the inner arm surfaces 130 of a hanger member 112. In at least one further embodiment, a noise reduction member 162 of a noise reduction assembly 160 in accordance with at least one embodiment of the present invention further comprises a noise reduction member cradle 164. A noise reduction member 162 in accordance with one embodiment of the present invention is disposed in an at least partially covering relation to a cradle 114 of a hanger member 112, such that the noise reduction member cradle 164 is disposed in an overlying relation to the cradle 114 of the hanger member 112. As may be seen from FIG. 1, a noise reduction assembly 160 comprises at least one noise reduction member 162 disposed in a covering relation to at least the cradle 114 of the hanger member 112.

Figure 6:
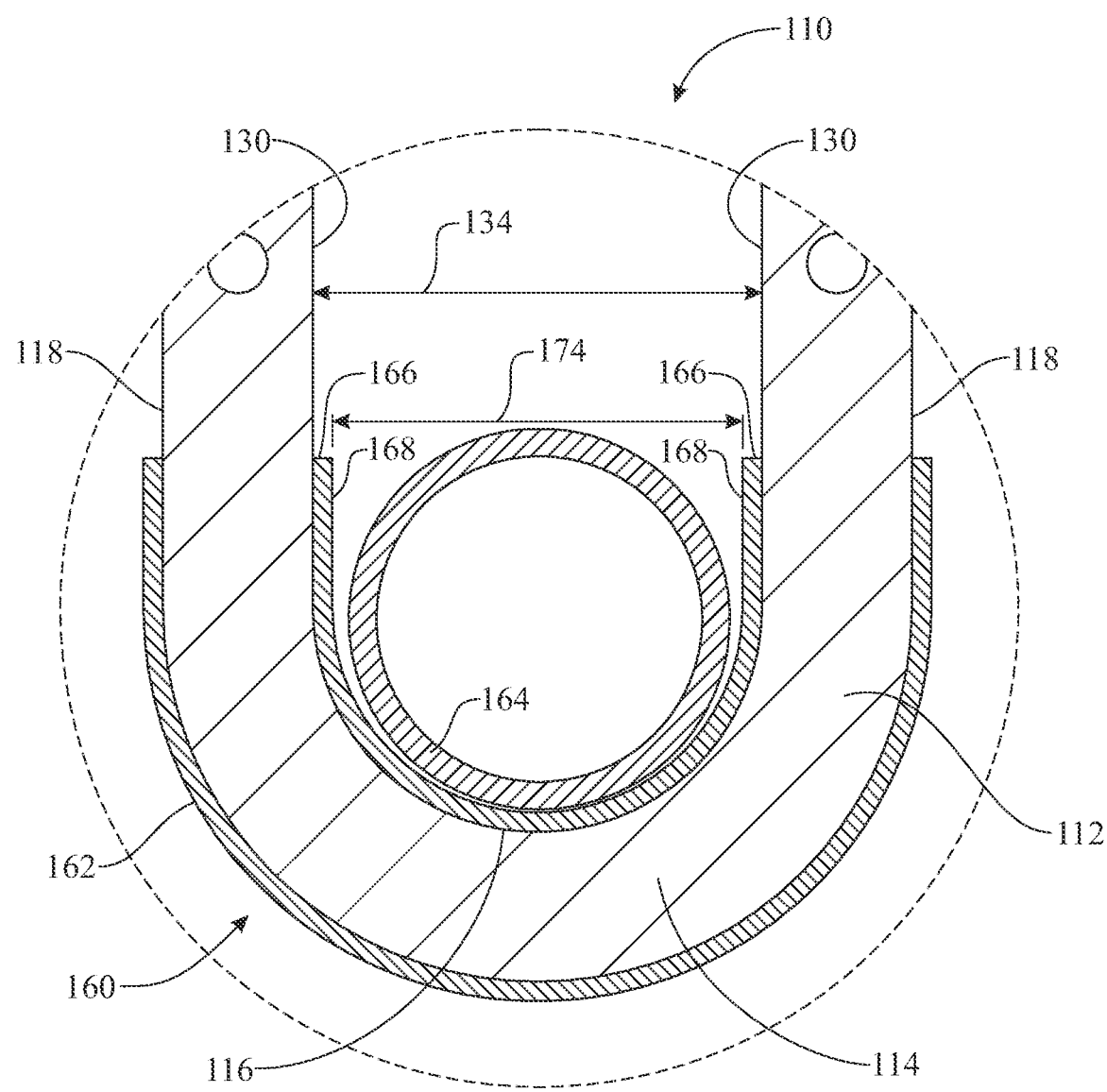
FIG. 6 a partial front cross-sectional view of the hanger member of FIG. 5 having a pipe supported therein as shown in inset 6 of FIG. 5, in accordance with the present invention.

A noise reduction member 162 in accordance with at least one embodiment of the present invention comprises oppositely disposed distal ends 166. With reference once again to the illustrative embodiment of FIG. 6, each of the oppositely disposed distal ends 166 of the noise reduction member 162 comprises a distal inner surface 168 which, collectively, at least partially define a noise reduction member clearance 174 there between. In accordance with at least one embodiment of the present invention, it is desirable to have a minimum clearance between the sidewalls of the pipe being supported and the distal inner surfaces 168 of the noise reduction member 162 of a hanger member 112, to allow positioning of the pipe while supported in the noise reduction member cradle 164 of the noise reduction member 162, once again, such as may be needed for purposes of installing fittings, pipe connections, terminal connections, etc. In at least one embodiment, a clearance of about one-sixteenth of an inch is desired between each distal inner surface 168 of the noise reduction member 162 and the sidewalk of a pipe supported therein. As such, in one further embodiment, a noise reduction member clearance 174 is at least one-eighth of an inch greater than the outside diameter of a pipe to be supported therein.

In accordance with at least one embodiment of the present invention, a noise reduction member 162 of the noise reduction assembly 160 is constructed of a material comprising noise dampening properties. As such, in at least one embodiment, a noise reduction member 162 is constructed of a soundproofing foam material of construction, such that, the noise reduction assembly 160 serves to dampen the sound of fluid flow through a pipe supported therein, such as the sound caused by thermal expansion when a hot fluid is flowing there through. A noise reduction assembly 160 in accordance with the present invention may further serve to dampen the sound of water hammer, such as may occur from time to time in piping installed in any of a variety of structures.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A pipe hanging system for aligned installation of a pipe from a plurality of support members of a support system without the use of external measuring devices, said system comprising:
   a hanger assembly including a plurality of hanger members each having a cradle with a cradle seat, each said cradle dimensioned to receive at least a portion of the pipe in a supported relation on said cradle seat therein;
   each of said plurality of hanger members further comprising a plurality of arms, each of said plurality of arms of each hanger member extending upwardly from opposite sides of said cradle in a substantially parallel and coplanar orientation with one another;
   each of said plurality of arms of each of said plurality of hanger members comprises a plurality of surfaces, wherein at least one of said plurality of surfaces comprises an inner surface, said inner surfaces of corresponding ones of said plurality of arms of each of said plurality of hanger members at least partially defining a hanger member clearance there between, wherein said hanger member clearance is greater than an outside diameter of the pipe to be received therein between;

each of said plurality of hanger members including an alignment assembly comprising a plurality of alignment marks disposed on and visible along at least a portion of at least one of said plurality of arms to facilitate positioning each of said plurality of hanger members relative to a preselected portion the plurality of support members use of external measuring devices;

said alignment assembly facilitates positioning a corresponding one of said plurality of hanger members relative to one of the plurality of support members via alignment of at least one of said plurality of alignment marks with the preselected portion of a corresponding one of the plurality of support members; and each of said plurality of hanger members also comprising a mounting assembly having a plurality of mounting apertures disposed through portions of at least one of said plurality of arms of said hanger member and at least one reusable fastener to mount said hanger member to a corresponding. one of the plurality of support members in an aligned orientation, wherein said aligned orientation is at least partially defined by said cradle seat of said hanger member disposed a predetermined distance from the preselected portion of a corresponding one of the plurality of support members onto which said hanger member is mounted.

2. The pipe hanging system as recited in claim 1 wherein said alignment assembly further comprises a plurality of alignment indicators disposed on and visible along at least a portion of at least one of said plurality of arms of each of said plurality of said hanger members, each of said plurality of alignment indicators corresponding to a different one of said plurality of alignment marks.

3. The pipe hanging system as recited in claim 2 wherein said plurality of alignment indicators comprise one or more of a numeral, an alphabetic character, an alphanumeric character, or a symbol.

4. The pipe hanging system as recited in claim 1 wherein at least one of said plurality of surfaces comprises a front arm surface, said plurality of alignment marks disposed on and visible along said front surface of at least one of said plurality of arms of each of said plurality of hanger members.

5. The pipe hanging system as recited in claim 1 wherein said hanger member clearance is at least one-eighth of an inch greater than an outside diameter of the pipe to be received in each of said plurality of hanger members.

6. The pipe hanging system as recited in claim 1 wherein said hanger member clearance is at least one-quarter of an inch greater than an outside diameter of the pipe to be received in each of said plurality of hanger members.

7. A pipe hanging system for aligned installation of a pipe from a plurality of support members of a support system without the use of external measuring devices, said system comprising:

a hanger assembly including a plurality of hanger members each having a cradle;

each of said plurality of hanger members further comprising a plurality of arms, each of said plurality of arms of each hanger member extending upwardly from opposite sides of said cradle in a substantially parallel and coplanar orientation with one another;

each of said plurality of hanger members including an alignment assembly comprising a plurality of alignment marks disposed on and visible along at least a portion of each of said plurality of arms to facilitate positioning each of said plurality of hanger members relative to a preselected portion of the plurality of support members without the use of external measuring devices;

said alignment assembly facilitates positioning a corresponding one of said plurality of hanger members relative to at least one of the plurality of support members via alignment of at least one of said plurality of alignment marks with the preselected portion of a corresponding one of the plurality of support members;

each of said plurality of hanger members also comprising a mounting assembly having a plurality of mounting apertures through portions of each of said plurality of arms of said hanger member and at least one reusable fastener to mount said hanger member to a corresponding one of the plurality of support members in an aligned orientation, wherein said aligned orientation is at least partially defined by said cradle seat of said hanger member disposed a predetermined distance from the preselected portion of a corresponding one of the plurality of support members onto which said hanger member is mounted; and each of said plurality of hanger members further including a noise reduction assembly comprising a noise reduction member disposed in a covering relation to said cradle of said hanger member, each said noise reduction member comprising a noise reduction cradle dimensioned to receive at least a portion of the pipe in a supported relation therein, wherein each said noise reduction member dampers the sounds associated with fluid flow there through.

8. The pipe hanging system as recited in claim 7 wherein each said noise reduction cradle comprises oppositely disposed inner surfaces at distal ends thereof, said oppositely disposed inner surfaces of each said noise reduction cradle at least partially defining a noise reduction member clearance there between, wherein said noise reduction member clearance is greater than an outside diameter of the pipe to be received therein.

9. The pipe hanging system as recited in claim 8 wherein said noise reduction member clearance is at least one-eighth of an inch greater than an outside diameter of the pipe to be received in said noise reduction cradle.

* * * * *